July 9, 1957
K. H. KINGDON
2,798,848
NEUTRONIC REACTOR FUEL ELEMENT
Filed July 13, 1951
2 Sheets-Sheet 1
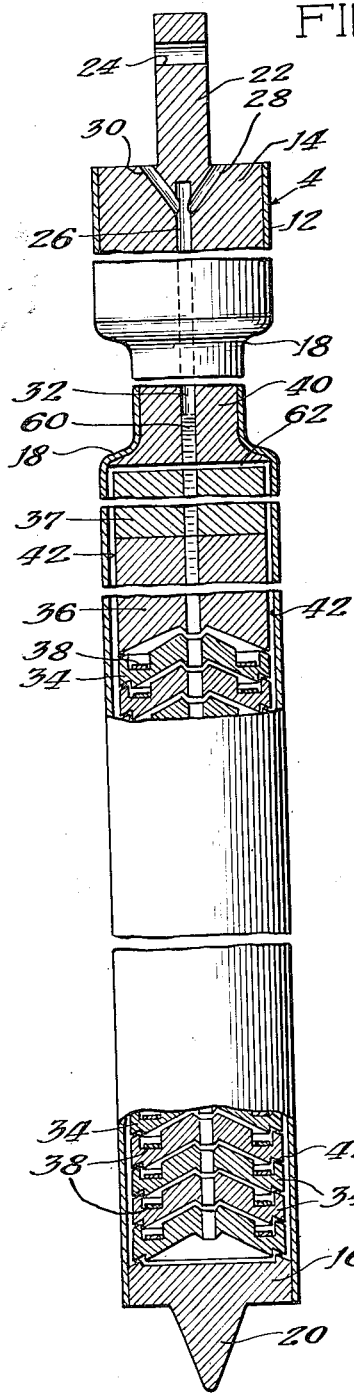
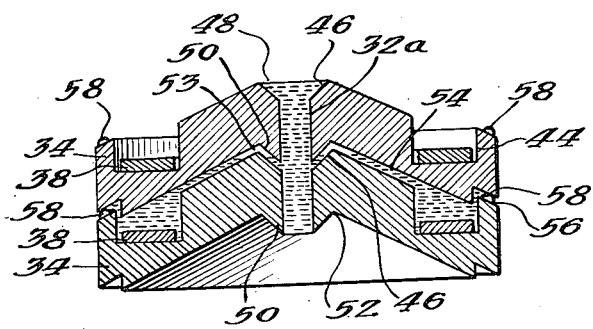
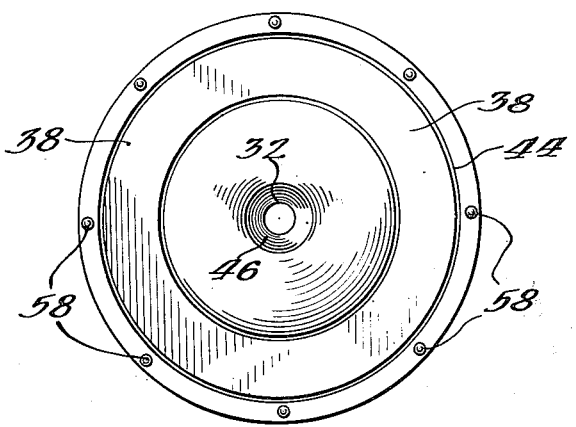
INVENTOR.
Kenneth H. Kingdon
BY
Roland A. Anderson
Attorney.

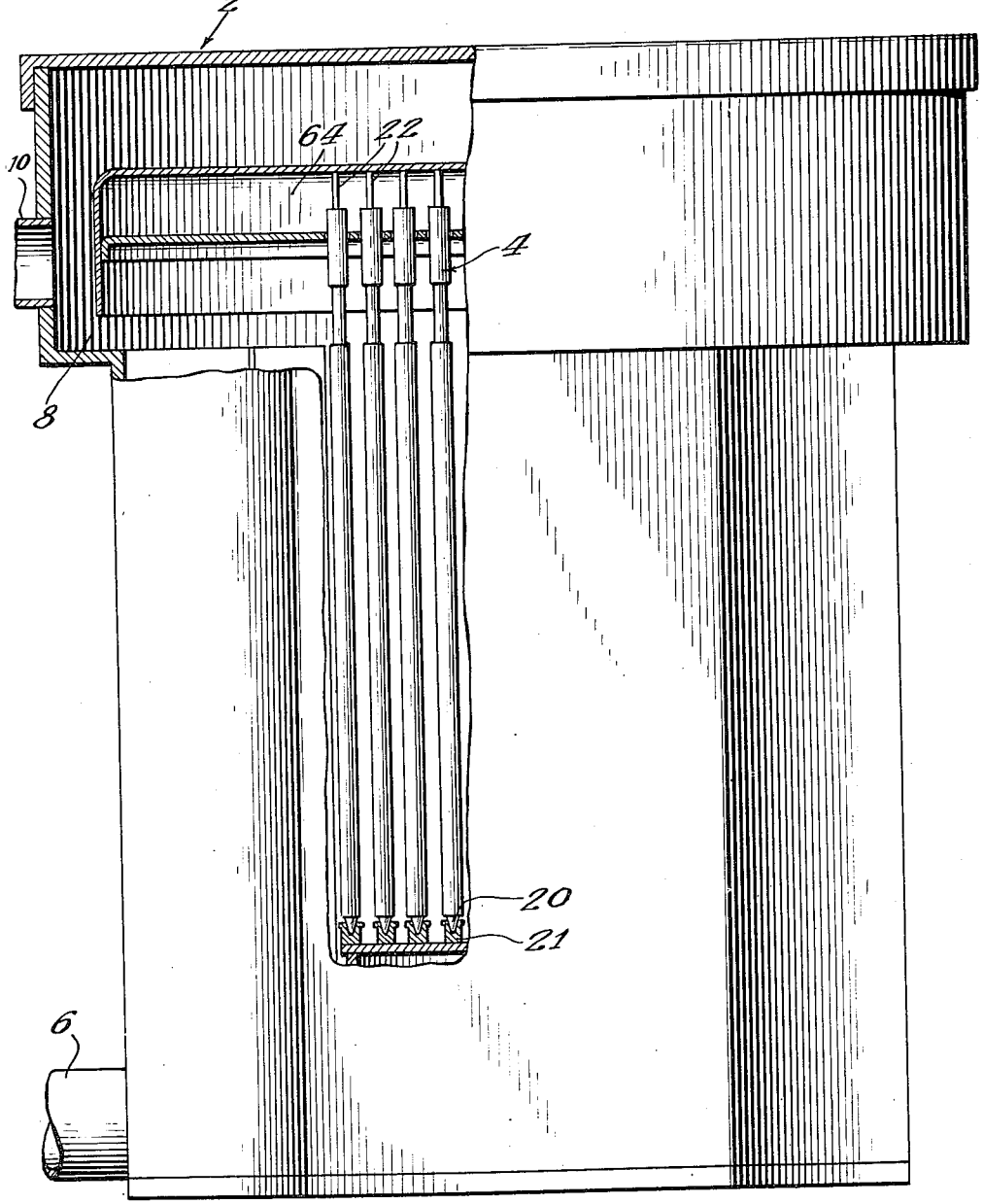

2,798,848
Patented July 9, 1957

2,798,848
NEUTRONIC REACTOR FUEL ELEMENT

Kenneth H. Kingdon, Schenectady, N. Y., assignor to the United States of America as represented by the United States Atomic Energy Commission Application July 13, 1951, Serial No. 236,646

9 Claims. (Cl. 204—193.2)

This invention relates generally to fuel elements in a neutronic reactor and it has particular relation to improvements therein for preventing the migration of disintegration products of uranium.

Inasmuch as this invention is concerned with the structure of a fuel element itself and not with the operation of the particular reactor in which it functions, a detailed discussion of a reactor employing the present fuel element will not be made herein. Fuel elements are susceptible to disintegration by nuclear processes whereby over a prolonged period of time fine particles of uranium separate from the main body and migrate to the various parts of the reactor. This presents a major hazard particularly to operating personnel. Neutronic reactors are disclosed in the copending applications of Enrico Fermi and Leo Szilard, Serial No. 568,904, filed December 19, 1944, now Patent No. 2,708,656, and of Walter H. Zinn, Serial No. 721,108, filed January 8, 1947.

Accordingly, among the objects of this invention are: the prevention of fuel migration from its predesigned location in the fuel element and reactor, and the provision of means for removing and collecting appreciable quantities of fission gases.

Other objects of this invention will, in part, be obvious and appear hereinafter.

For a more complete understanding of the nature and scope of this invention, reference can be had to the following detailed description taken together with the accompanying drawings in which:

Figure 1 is an elevation view, partly in section, of a fuel element embodying the present invention;

Figure 2 is an enlarged vertical sectional view of a portion of the fuel element, showing the manner in which the fissionable material is disposed within said element;

Figure 3 is a plan view of the element shown in Figure 2; and

Figure 4 is an elevational view, partly in section, of a neutronic reactor.

Referring to Figure 4 a neutronic reactor is generally indicated at 2. Centrally disposed therein are a plurality of fuel elements 4 which are sufficiently spaced from each other to permit passage of a liquid coolant (not shown). The liquid enters the reactor 2 through an inlet 6 and rises between the elements 4 to a plenum chamber 8 from which it exits via an outlet 10.

In Figure 1, one of the fuel elements 4 is indicated. This element comprises essentially a stack of alternate fissionable and moderating wafers in a sodium-filled tube. More specifically it comprises an enclosed tubular jacket 12 of nonfissionable material, preferably of stainless steel. For ease of fabrication the jacket is circular in cross-section, although other shapes, such as hexagonal, are feasible. Since a greater portion of the length of the element 4 is intended to be immersed in a liquid coolant, the upper and lower ends of the jacket 12 are closed by a cap 14 and a base 16, respectively, in a fluid-tight manner. Near the top of the jacket 12 is a necked portion 18, which (as shown in Figure 4) together with similar portions of other elements 4 facilitate movement of the coolant in the chamber 8 toward the outlet 10.

Integral with the base 16 is a wedge portion 20 projecting centrally from and normally to the undersurface thereof. It is provided for insertion into a complementary V-shaped bracket 21 (shown in Figure 4) as a means for retaining the lower end of the element in a fixed position.

Projecting upwardly from the top of the cap 14 is a hanger 22 having a hole 24 by which the element 4 is handled while it is being placed in position within the reactor 2 by proper means, such as an overhead crane. Centrally located in the cap 14 is a bore 26 extending from its undersurface to an upper point that connects with branches 28 and 30 which communicate with the upper surface of said cap. The bore 26 is the top portion of an axial bore 32 which extends from the base 16.

The active portions of the element 4 are disposed between the cap 14 and the base 16. A plurality of neutron moderating wafers 34 are stacked upon the base 16 and extend over a greater portion of the element 4. Each wafer 34 supports a wafer 38 of thermal neutron fissionable material that is preferably a $U^{235}$-enriched uranium body or the like. Above the top wafer 34 is a neutron-reflecting mass of moderating material 36. The wafers 34 and the moderating material 36 are preferably composed of beryllium. In addition, above the moderating material 36 is disposed a quantity of breeding material 37, such as thorium. Between the breeding material 37 and the cap 14 is a member 40 of nonfissionable material, such as nickel, mounted within the necked portion 18.

The wafers 34 together with the moderator 36 and the breeder 37 are preferably annular to conform with the cylindrical jacket 12. Having an outside diameter slightly less than the inside diameter of the jacket 12, an annular space 42 is formed therewith. Each wafer 34 is annular in order to provide a central bore segment 32a (Figure 2) to form a continuation of the bore 32. In addition, each wafer 34 has upper and lower surfaces upwardly inclined from the periphery toward the bore segment 32a. In the upper surface is disposed an annular recess 44 symmetrically about the bore. Within this recess rests one wafer 38 of fissionable material, the preferred shape of which is annular. About the upper end of the bore segment 32a is a bevel 46 that joins the upper surface at a line 48. Likewise, about the lower end of the bore segment 32a is a protrusion 50 that joins the inclined undersurface at a line 52. By virtue of these configurations a pair of the wafers 34, when stacked one above the other, as shown in Figure 2, form a passage 54 between the lower surface of an upper member and the upper surface of a lower member. The passage 54 is inclined upwardly from the recess 44 to a crest from which the passage is inclined downwardly to the bore 32. Manifestly, the recess 44 communicates with the bore via the passage 54. In addition, the recess 44 communicates with the annular space 42 through a passage 56 between the wafers 34 adjacent the outer periphery. The proper spacing between wafers 34 to provide both passages 54 and 56 is provided by a plurality of lugs 58 on the upper surface of each wafer 34 on which the upper wafer 34 rests.

Between the breeding material 37 and the cap 14 the member 40 has a smaller outside diameter to conform with the contiguous necked portion 18 of the jacket 12. As in the wafers 34, the moderator 36, and the breeding material 37, the bore 32 passes centrally through the member 40 to meet the bore 26 in the cap 14.

Operation

In operation it is contemplated that a plurality of fuel elements 4 are immersed in a suitable liquid coolant, such as liquid sodium or an alloy of sodium and potassium. With the elements 4 arranged contiguous to each other (Figure 4), the coolant enters at the bottom and rises to a point near the top where the necked portions 18 of the combined elements 4 serve to facilitate movement in the plenum chamber 8 as set forth above.

In addition each assembly within the jacket 12 is filled with a thermally conductive liquid 60 (shown in Figure 1 only in bore 32), such as sodium, to effect a good heat transfer between the parts. The top level of the liquid 60 is fixed at a point within the member 40. By virtue of heat of fission the liquid 60 is circulated by convection upward through the bore 32. At the top of the breeding material 37 it moves radially through a flat chamber 62, disposed between said material and the member 40, to the top of the annular space 42. From this juncture the liquid 60 moves downward, yielding its heat to the jacket 12 that is cooled externally by the suitable liquid coolant in which the element 4 is immersed. At the bottom of the space 42 the liquid 60 passes between the lowermost member 34 and the base 16, from which point it rises through the bore 32 to renew the cycle.

In the event of prolonged operation, physical disintegration of the uranium bodies 38 may occur due to nuclear processes, causing fine particles of uranium to separate from each wafer body 38. These particles disseminate into the liquid 60 and, by virtue of the convection therein, are carried throughout the interior of the fuel element 4. This fact would be a hazard were it not for a gas trap 53 formed in the crest of the passage 54. Simultaneously with the dissemination of uranium particles, fission gases, such as krypton and xenon, are evolved. These gases leave the vicinity of the wafers 38 via the passage 54 together with the particles of uranium. As the gases accumulate, the liquid 60 within that portion of the passage is forced into the bore 32. When the trap becomes full of gases, bubbles of gas will escape into the bore 32 and rise to a gas collection chamber 64 (Figure 4) outside of the active portion of the reactor. However, since there is no continuous sodium path between the recess 44 and the bore 32, all uranium particles are retained between the wafers 34 and within the active portion of the reactor.

Throughout the foregoing specification, several of the parts have been described as being annular in shape. The invention is not limited to this one shape, however, because obviously oval or slightly off-circular shapes will be just as satisfactory. Also square, rectangular, hexagonal and other like shapes would function equally well. Since circular shapes may be regarded as having an infinite number of sides, the term polygonal is used to include all of these shapes mentioned as well as other equivalent shapes.

Since certain changes can be made in the foregoing embodiment of the present invention, it is intended that all matter shown in the accompanying drawings and description shall be interpreted as illustrative only and may be modified without departing from the intended scope of the invention.

What is claimed is:

1. In a fuel element for a neutronic reactor comprising a neutron moderator having at least one recess therein, and thermal neutron fissionable material within the recess, the moderator having a passage connecting the recess to the surface thereof, the improvement wherein said passage has a gas trap whereby migration of fissionable material is prevented while gases generated by fission escape through said passage.

2. In a fuel element for a neutronic reactor comprising an elongated cylinder of material nonfissionable by thermal neutrons, a mass of neutron moderator within the cylinder having a plurality of recesses therein, and thermal neutron fissionable material in each recess, the mass having a passage connecting each recess to the surface of the mass, the improvement wherein said passage has a gas trap whereby migration of fissionable material is prevented while gases generated by fission escape through said passage.

3. In a fuel element for a neutronic reactor comprising a tubular jacket of material non-fissionable by thermal neutrons, a neutron moderator within the jacket having a plurality of recesses therein, a body of thermal neutron fissionable material in each recess, the moderator having a first passage one end of which is disposed at the surface of the jacket, the moderator also having a second passage connecting each recess to the first passage, and a coolant liquid in the recesses and passages, the improvement wherein said connecting passage has a gas trap whereby migration of fissionable material is prevented while gases generated in fission escape to the first passage.

4. In a fuel element for a neutronic reactor comprising a tubular jacket of material nonfissionable by thermal neutrons, a plurality of neutron moderators stacked within the jacket and having substantially central alignable apertures, each moderator having a substantially annular recess about the aperture in one surface, and a wafer of thermal neutron fissionable material in each recess, the improvement wherein said surface of each neutron moderator member is convexly conical between the recess and a point near the aperture and is concavely conical between said point and the aperture, the other surface of each member is concavely conical between the periphery to a point near the aperture and is convexly conical between said point and the aperture, the jacket being adapted to contain a thermal conductive liquid, immersing the moderators and the wafers to establish a thermal bond therebetween, whereby migration of fissionable material carried by the liquid is prevented while gases generated in fission escape through the aperture.

5. In a fuel element for a neutronic reactor comprising a jacket of material nonfissionable by thermal neutrons, a plurality of neutron moderators stacked within the jacket and having substantially central alignable apertures, each moderator having a substantially annular recess about the aperture in one surface, and a wafer of thermal neutron fissionable material in each recess, the jacket being adapted to contain a thermally conductive liquid, immersing the moderators and the wafers to establish a thermal bond therebetween, the improvement wherein said neutron moderators have a convexly conical channel between the recess to a point near the aperture and a concavely conical channel between said point and the aperture whereby migration of fissionable material carried by the liquid is prevented while fission gases escape through the channel and aperture.

6. In a fuel element for a neutronic reactor comprising a jacket of material nonfissionable by thermal neutrons, a plurality of annular neutron moderators stacked within the jacket forming a substantially central axial bore, each moderator having an annular recess about the bore, and a wafer of thermal neutron fissionable material in the recess, the jacket being adapted to contain a thermally conductive liquid immersing the moderators and wafers, the improvement wherein each moderator also has parallel opposite surfaces is convexly conical between the periphery to a point near the bore and is concavely conical between said point and the bore, the surface of one moderator being spaced from the surface of the moderator adjacent to it so as to form a gas trap therebetween whereby the migration of fissionable material carried by the liquid is prevented while fission gases escape through said passage.

7. In a fuel element for a neutronic reactor comprising an elongated jacket of stainless steel, a plurality of annular beryllium members stacked within the jacket so as to form an axial bore, each member having an annular recess about the bore, and an annular body of uranium in the recess, the jacket being adapted to contain liquid sodium, immersing the members and bodies, the improvement wherein each member also has opposite parallel surfaces convexly conical between the periphery and a point near the bore and is concavely conical between said point and the bore, the surface of one member being spaced from the surface of the member adjacent to it so as to form a gas trap therebetween whereby the migration of fissionable material carried by the liquid is prevented while fission gases escape through said passage.

8. An improved article of manufacture comprising a member of a neutronically efficient neutron moderating material having a substantially annular recess and a substantially central aperture in the one surface, and also having an opposite parallel surface, said one surface being convexly conical between the periphery and a point near the aperture, said one surface also being concavely conical between said point and the aperture.

9. An improved article of manufacture comprising a beryllium wafer having an annular recess in one surface, the wafer having a central aperture, and also having an opposite parallel surface, said one surface being convexly conical between the recess and a point near the aperture and being concavely conical only between said point and the aperture.

References Cited in the file of this patent

UNITED STATES PATENTS 2,217,116  Hunt et al. -------------- Oct. 8, 1940

FOREIGN PATENTS 630,726  Great Britain ---------- Mar. 30, 1936